(12) United States Patent
Petronic et al.

(10) Patent No.: US 11,828,269 B2
(45) Date of Patent: Nov. 28, 2023

(54) GREASE COLLECTION ARRANGEMENT FOR COLLECTING WASTE GREASE FROM A GREASE LUBRICATED ROTOR BLADE PITCH BEARING OF A WIND TURBINE

(71) Applicant: Siemens Gamesa Renewable Energy A/S, Brande (DK)

(72) Inventors: Vujadin Petronic, Brande (DK); Jan Soendergaard Pedersen, Brande (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 149 days.

(21) Appl. No.: 17/476,570

(22) Filed: Sep. 16, 2021

(65) Prior Publication Data
US 2022/0099069 A1 Mar. 31, 2022

(30) Foreign Application Priority Data
Sep. 25, 2020 (EP) ..................... 20198297

(51) Int. Cl.
*F03D 80/70* (2016.01)
*F16N 21/00* (2006.01)
*F16N 31/00* (2006.01)

(52) U.S. Cl.
CPC ............. *F03D 80/70* (2016.05); *F16N 21/00* (2013.01); *F16N 31/004* (2013.01);
(Continued)

(58) Field of Classification Search
CPC ........ F03D 80/70; F16N 21/00; F16N 31/004; F16N 2210/025; F16N 2210/14; F05B 2240/50; F05B 2260/98
See application file for complete search history.

(56) References Cited

U.S. PATENT DOCUMENTS 2,299,119 A * 10/1942 Lucien .................... F16N 31/00
384/130
4,741,155 A * 5/1988 McCarty ................. F01D 25/18
60/39.08
(Continued)

FOREIGN PATENT DOCUMENTS

CN 102588723 A 7/2012
CN 102753820 A 10/2012
(Continued)

OTHER PUBLICATIONS

KR20150001711 - Machine translation (Year: 2015).*

*Primary Examiner* — Michael A Riegelman
(74) *Attorney, Agent, or Firm* — Schmeiser, Olsen & Watts LLP

(57) ABSTRACT

Provided is a grease collection arrangement for collecting waste grease from a grease lubricated rotor blade pitch bearing of a wind turbine, whereby the grease collection arrangement includes at least one waste grease collector and multiple extraction tubes, wherein each one of the multiple extraction tubes is connected to the at least one waste grease collector and the multiple extraction tubes are configured to being connected to multiple grease outlets of the rotor blade pitch bearing, whereby the grease collection arrangement is configured such that the waste grease from the rotor blade pitch bearing can flow into the at least one waste grease collector by gravity and centrifugal forces.

13 Claims, 7 Drawing Sheets

(52) U.S. Cl.
    CPC ....... *F05B 2240/50* (2013.01); *F05B 2260/98* (2013.01); *F16N 2210/025* (2013.01); *F16N 2210/14* (2013.01)

(56) References Cited

U.S. PATENT DOCUMENTS

| | | | | |
|---|---|---|---|---|
| 4,941,550 | A * | 7/1990 | Blake | F16N 11/04 |
| | | | | 184/45.1 |
| 5,749,660 | A * | 5/1998 | Dusserre-Telmon | ......... |
| | | | | F16C 19/166 |
| | | | | 384/475 |
| 6,991,378 | B2 * | 1/2006 | Jacquemont | F16C 33/6607 |
| | | | | 384/473 |
| 2011/0293425 | A1 * | 12/2011 | Numajiri | F03D 7/0224 |
| | | | | 416/147 |
| 2012/0093450 | A1 * | 4/2012 | Baun | F03D 80/70 |
| | | | | 384/385 |
| 2012/0170879 | A1 * | 7/2012 | Bauer | F03D 80/00 |
| | | | | 384/91 |
| 2017/0152859 | A1 * | 6/2017 | Miller | F02K 3/06 |
| 2021/0332944 | A1 * | 10/2021 | Madsen | F16C 33/102 |
| 2022/0099069 | A1 * | 3/2022 | Petronic | F16N 21/00 |

FOREIGN PATENT DOCUMENTS

| | | | |
|---|---|---|---|
| CN | 205137028 U | * | 4/2016 |
| CN | 207333113 U | | 5/2018 |
| KR | 20130035451 A | | 4/2013 |
| KR | 20150001711 U | | 5/2015 |

\* cited by examiner

GREASE COLLECTION ARRANGEMENT FOR COLLECTING WASTE GREASE FROM A GREASE LUBRICATED ROTOR BLADE PITCH BEARING OF A WIND TURBINE

CROSS-REFERENCE TO RELATED APPLICATIONS

This application claims priority to EP Application No. 20198297.2, having a filing date of Sep. 25, 2020, the entire contents of which are hereby incorporated by reference.

FIELD OF TECHNOLOGY

The following relates to a grease collection arrangement for collecting waste grease from a grease lubricated rotor blade pitch bearing of a wind turbine, a grease lubricated rotor blade pitch bearing of a wind turbine and a wind turbine.

BACKGROUND

Most large wind turbines have rotor blades that can be pitched about their longitudinal axes. The circular root end of a rotor blade terminates at a pitch bearing. A pitch system actuates one or more drive motors in response to a command from the wind turbine controller to pitch the rotor blade by a determined angular amount. A reliable lubrication of the pitch bearing is very important for various reasons. Damage to a pitch bearing can result in wind turbine downtime, with the attendant reduction in annual energy production. The reliability of the pitch bearings is particularly relevant in the case of an offshore wind turbine because service routines are expensive and hazardous.

A rotor blade of a large wind turbine can have a length in the region of 90 m, a mass in the region of 50000 kg and a root end diameter in the order of 5 m. The pitch bearing of such a large rotor blade may be realized as a roller bearing, a ball bearing, a slider bearing, etc. The stationary part and the rotating part of the bearing are separated at all times by a film of oil or grease. Since the lubricant deteriorates over time, a pitch bearing is generally equipped with a lubricant system which is able to replenish the lubricant as required.

Various lubrication systems are available, and most systems include a grease reservoir and one or more feeder lines to grease inlets of the bearing. Controlled quantities of grease are fed at intervals into the bearing. In a single-line lubrication system, a pump station delivers lubricant through a single supply line to a lubricant metering device serving a single lubrication point. A pitch bearing of a large rotor blade can have several of such lubrication points. In a progressive lubrication system, lubricant is continuously transported to various lubrication points as long as the lubricant pump is running. When the pump is halted, the pistons of a metering device will also stop, and will "hold" their positions. When the pump starts supplying lubricant again, the metering device pistons resume from those positions.

Grease deteriorates over time, and the waste grease must be removed and collected in a controlled manner. The collected waste grease can then be removed, for example during a scheduled service routine, and disposed of. Generally, the lubricant points are distributed evenly about a rotor blade pitch bearing, and this symmetry is reflected in the waste grease collection.

In a configuration of a grease collection arrangement from the state of the art, multiple waste grease cups are attached directly to respective waste grease outlets of the rotor blade pitch bearing, which are distributed evenly about the pitch bearing. In such a configuration, there may be up to 24 or more waste grease cups per rotor blade pitch bearing. It is cumbersome, to remove the waste grease from every single one of the waste grease cups due to their large number and the need to detach the waste grease cups from the pitch bearing for removing the waste grease therefrom.

Further, it has been observed that not all of the waste grease cups get filled with the same amount of waste grease. It has been found that there are certain waste grease outlets, from which a larger amount of waste grease can be collected, than from other waste grease outlets. The reason for this is not yet entirely understood but the inventors assume, that the reason for this behavior may be found in the pitching operation of the rotor blade pitch bearing. Generally, the rotor blade is not pitched about its entire 360° but instead only pitched within a narrower range, e.g., over 90°.

SUMMARY

An aspect relates to provide a waste grease collection arrangement that overcomes the problems described above.

In particular, the aspect is solved by a grease collection arrangement for collecting waste grease from a grease lubricated rotor blade pitch bearing of a wind turbine, a grease lubricated rotor blade pitch bearing of a wind turbine and a wind turbine. Further details of the invention unfold from the other claims as well as the description and the drawings. Thereby, the features and details described in connection with the grease collection arrangement of the invention apply in connection with the rotor blade pitch bearing of the invention and the wind turbine according to the invention, so that regarding the disclosure of the individual aspects of the invention it is or can be referred to one another.

According to a first aspect of embodiments of the invention, embodiments of the invention are solved by means of a grease collection arrangement for collecting waste grease from a grease lubricated rotor blade pitch bearing of a wind turbine, whereby the grease collection arrangement comprises at least one waste grease collector and multiple extraction tubes, wherein each one of the multiple extraction tubes is connected to the at least one waste grease collector and the multiple extraction tubes are configured to be connected to multiple grease outlets of the rotor blade pitch bearing, whereby the grease collection arrangement is configured such that the waste grease from the rotor blade pitch bearing can flow into the at least one waste grease collector by means of gravity and centrifugal forces.

Accordingly, instead of attaching grease cups to each one of the grease outlets of the rotor blade pitch bearing, embodiments of the invention provide for one or more waste grease collectors, to which multiple extraction tubes are attached and the principle of forcing the waste grease by means of gravity and centrifugal force into the one or more waste grease collectors is applied for collecting the waste grease. Accordingly, the at least one waste grease collector or each of more than one waste grease collectors is connected by multiple extraction tubes to several waste grease outlets of the rotor blade pitch bearing.

Instead of detaching and emptying a large number of waste grease cups attached to the waste grease outlets, embodiments of the invention provide for a simpler solution because less waste grease collectors must be emptied. Further, it is more likely, that the waste grease collectors are actually full or nearly full when they are emptied, because the extraction tubes of one of the at least one waste grease collectors connect to multiple of the waste grease outlets and thereby the at least one waste grease collector gets filled with waste grease from multiple waste grease outlets. In particular, the extraction tubes may be connected mostly to those waste grease outlets of the rotor blade pitch bearing, from which it is known by experience or calculation, that extraction of waste grease from these is likely and/or in a large amount.

Also, the waste grease collectors may be designed with a larger capacity than the waste grease cups as they are not directly attached to the waste grease outlets, e.g., by screwing them into the rotor blade pitch bearing, but connected thereto by means of the extraction tubes.

The multiple extraction tubes may comprise short tubes and long tubes, the long tubes being relatively longer than the short tubes, wherein the short tubes are configured for collecting the waste grease and the long tubes are configured for pressure relief. Further, the number of short tubes may be larger than the number of long tubes. The short tubes provide for easy collection of waste grease from the waste grease outlets of the rotor blade pitch bearing by means of the gravity and centrifugal forces caused by the rotation of the rotor. These short tubes may be connected to those waste grease outlets, which have been previously determined as waste grease outlets with a high likelihood for extraction of waste grease therefrom. Due to their relatively short length and consequently short path of transportation for the waste grease from the waste grease outlet to the waste grease collector, these short hoses are unlikely to be blocked with waste grease. However, the relatively longer tubes are not, at least not primarily, for the collection of the waste grease but for pressure relief inside of the rotor blade pitch bearing due to the pressure build up inside thereof because of the pitching of the rotor blade. Accordingly, it has been found, that at least one or more of those waste grease outlets, from which it is unlikely that waste grease can be extracted, still should be connected to the at least one waste grease collector due to the pressure built up inside of the rotor blade pitch bearing during its pitching operation.

The multiple extraction tubes may be extraction hoses. Extraction hoses are flexible. The extraction hoses allow for flexible arrangement of the at least one waste grease collector and easy installation of the grease collection arrangement.

The grease collection arrangement may comprise one to four waste grease collectors. It has been found, that by accordingly sizing the waste grease collectors, this number of waste grease collectors may be sufficient for collecting the waste grease from the rotor blade pitch bearing. The waste grease collector may be sized such that it may contain up to 100 kg, in particular up to 80 kg and more particular up to 60 kg of waste grease, for example. Such limitation of the weight that a waste grease collector can contain, which may be designed by means of limited volume of the waste grease collector, provides for easier emptying of the waste grease collector by a service technician. The specific number of waste grease collectors may be chosen according to the size of the rotor blade pitch bearings.

Also, the grease collection arrangement may comprise multiple waste grease collectors. Thereby the waste grease may be collected at different points of a large rotor blade pitch bearing without needing to make the extraction tubes too long, which could eventually lead to a blocked tube, and for a long time until the waste grease collectors need to be emptied, in particular, when their volume is limited for easier handling by the service technician.

At least two, in particular at least four or at least six, first extraction tubes of the multiple extraction tubes may be connected to a first waste grease collector of the multiple waste grease collectors. Further, at least two, in particular at least four or at least six, second extraction tubes of the multiple extraction tubes may be connected to a second waste grease collector of the multiple waste grease collectors. Accordingly, several of the multiple extraction tubes are connected to each one of the multiple waste grease collectors such that waste grease may be conveniently extracted from multiple waste grease outlets located at different points at the rotor blade pitch bearing.

The at least one waste grease collector may comprise at least one air vent. Thereby, the pressurized air from inside of the rotor blade pitch bearing may be transferred to the at least one waste grease collector and released therefrom via the air vent. The air vent may be designed as an air vent opening such as an air vent hole or air vent slot, for example.

The at least one waste grease collector may comprise a container and a lid for closing the container. The lid can be comfortably opened for accessing the waste grease to be remove from inside of the container.

The waste grease collector may further comprise a bag for collecting the waste grease and the bag may be releasably attached to the lid. By means of collecting the waste grease inside of the bag, the waste grease can be easily removed together with the bag from the waste crease collector and consequently disposed of together with the waste grease collected inside the bag. By opening and lifting the lid, the bag is lifted together with the lid and removed from inside the container due to the bag being removably attached to the lid, which further eases emptying of the at least one waste grease collector. The bag may be a plastic bag, for example.

The lid may comprise multiple grease inlets for the multiple extraction tubes. Accordingly, the multiple extraction tubes may be connected to the multiple grease inlets. Accordingly, the lid may be easily removed from the container together with the extraction tubes attached to the grease inlets. The number of grease inlets per lid may be equal to the number of extraction tubes connected to that waste grease collector.

According to a second aspect of embodiments of the invention, an aspect relates to a grease lubricated rotor blade pitch bearing of a wind turbine, the rotor blade pitch bearing comprising the grease collection arrangement according to the first aspect of embodiments of the invention, whereby the multiple extraction tubes of the grease collection arrangement are connected to multiple grease outlets of the rotor blade pitch bearing.

The rotor blade pitch bearing may comprise a main waste grease collection circumference section and a pressure relief circumference section. More of the multiple extraction tubes may be connected to waste grease outlets in the main waste grease collection circumference section than in the pressure relief circumference section. The main waste grease collection circumference section and the pressure relief circumference section may be equally sized sections. Both sections may have the size of a quarter circumference of the overall circumference of the rotor blade pitch bearing or, in other words, circulate 90° about a center of the rotor blade pitch bearing. The main waste grease circumference section may be located opposite to the pressure relief circumference section. The short hoses may be connected to the waste grease outlets in the main waste grease collection circumference section and the long hoses may be connected to one or more waste grease outlets in the pressure relief circumference section.

The rotor blade pitch bearing may further comprise two secondary waste grease collection circumference sections in between the main waste grease collection circumference section and the pressure relief circumference section. More of the multiple extraction tubes may be connected to waste grease outlets in any one of the secondary waste grease collection circumference sections than in the pressure relief circumference section. Both secondary waste grease collection circumference sections may have the size of a quarter circumference of the overall circumference of the rotor blade pitch bearing or, in other words, circulate 90° about a center of the rotor blade pitch bearing. Both secondary waste grease collection circumference sections may be located opposite to one another and as direct neighbors to the main waste grease collection circumference section and the pressure relief circumference section. In the main waste grease collection circumference section, it is more likely that waste grease can be extracted from the waste grease outlets located therein than in the secondary waste grease collection circumference sections. And in the secondary waste grease collection circumference sections, it is more likely that waste grease can be extracted from the waste grease outlets located therein than in the pressure relief circumference section, where one or more waste grease outlets are utilized for pressure relief.

According to a third aspect of embodiments of the invention, an aspect relates to a wind turbine comprising the rotor blade pitch bearing according to the second aspect of embodiments of the invention.

The wind turbine may comprise rotor blade pitch bearings according to the second aspect of embodiments of the invention according to its number of rotor blade pitch bearings, i.e. two or three, for example. Accordingly, the wind turbine may have two or three or more rotor blades, which are connected to a rotor of the wind turbine.

BRIEF DESCRIPTION

Some of the embodiments will be described in detail, with reference to the following figures, wherein like designations denote like members, wherein.

DETAILED DESCRIPTION

Figure 1:
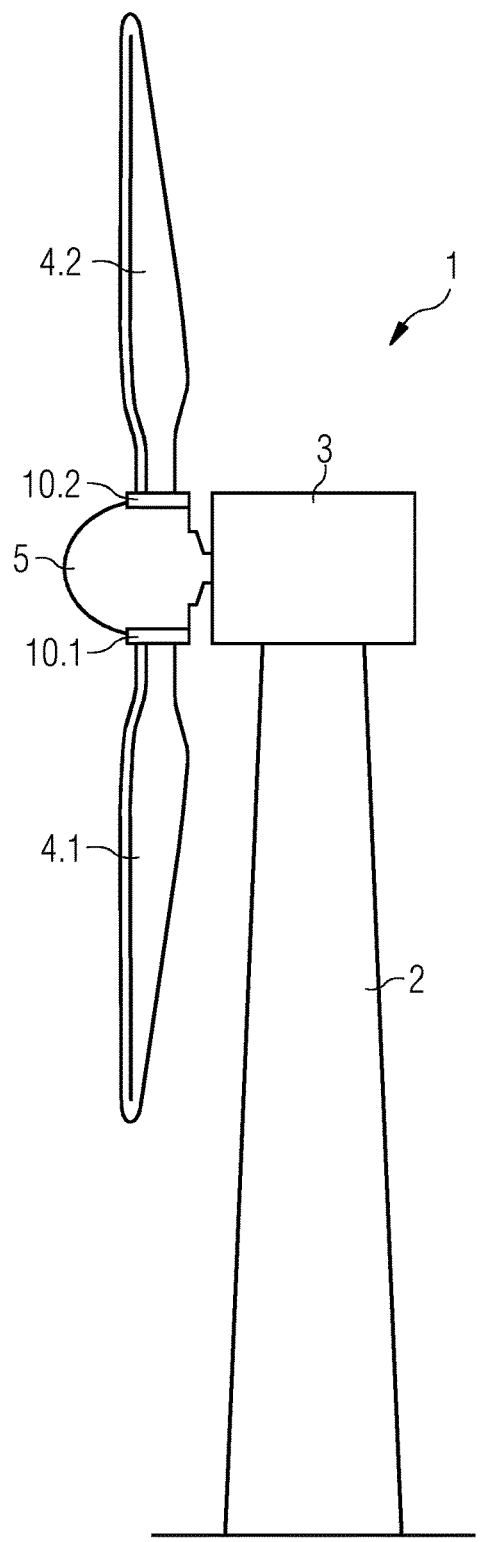
FIG. 1 shows a side perspective view on a wind turbine.

FIG. 1 shows a wind turbine 1. The wind turbine 1 comprises a tower 2 and a nacelle 3 supported on the tower 2. A rotor 5 is coupled to a drive (not shown) inside of the nacelle 3. Two rotor blades 4.1, 4.2 are attached to the rotor 5 via rotor blade pitch bearings 10.1, 10.2. Alternatively, more than two rotor blades 4 may be attached to the rotor 5.

Figure 2:
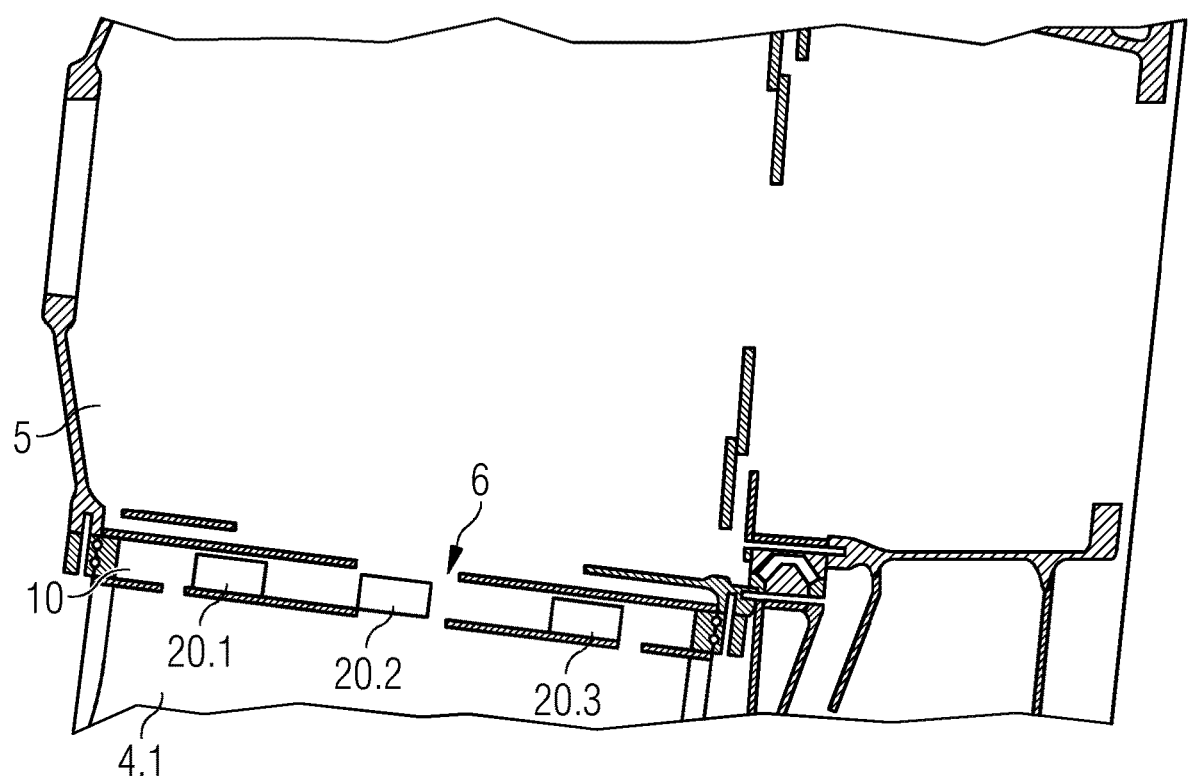
FIG. 2 shows a sectional view on a rotor blade pitch bearing of a wind turbine.

FIG. 2 shows a partial sectional view of the wind turbine 1 at the location of the rotor blade pitch bearing 10.1 according to FIG. 1. From this view it can be taken that three waste grease collectors 20.1, 20.2, 20.3 of a waste grease collection arrangement 6 are located inside of the rotor blade pitch bearing 10.1. The waste grease collectors 20.1, 20.2, 20.3 are shown only schematically in FIG. 2 and are shown in more detail in FIGS. 4 to 6 and will be described later in more detail with reference to the FIGS. 4 to 6.

Figure 3:
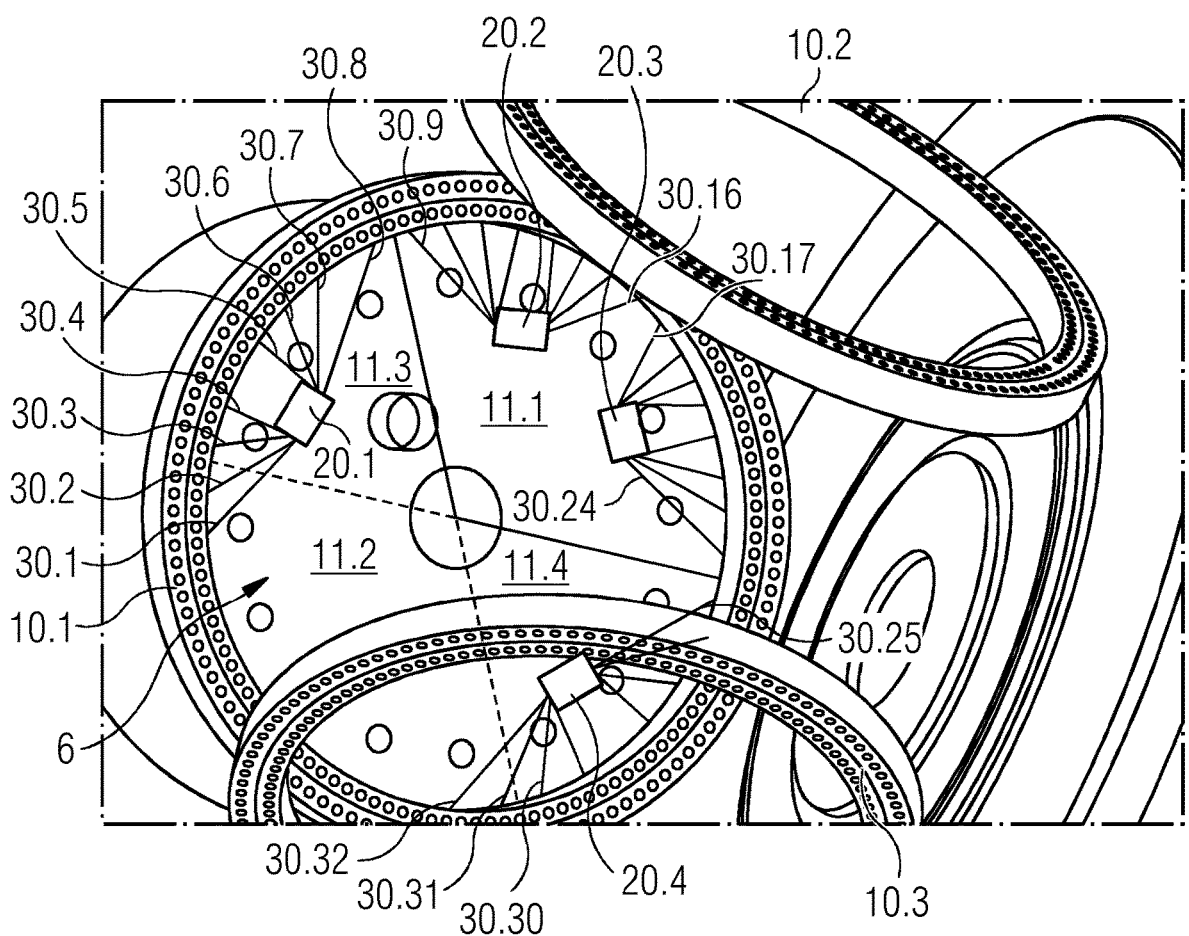
FIG. 3 shows a further view on an alternative rotor blade pitch bearing of a wind turbine.

FIG. 3 shows an alternative view on a different wind turbine 1 and at the location of three rotor blade pitch bearings 10.1, 10.2, 10.3 of the wind turbine 1. Only the rotor blade pitch bearing 10.1 is shown and explained in more detail. However, the other rotor blade pitch bearings 10.2, 10.3 may be designed the same as the rotor blade pitch bearing 10.1.

As can be taken from FIG. 3, a face of the rotor blade pitch bearing 10.1 is divided into four face segments 11.1, 11.2, 11.3, 11.4. In the first face segment 11.1, two waste grease collectors 20.2, 20.3 are located. Extraction tubes 30 in the form of extraction hoses 30.9-30.24 are connected to the waste grease collectors 20.2, 20.3 and waste grease outlets (not shown) in the rotor blade pitch bearing 10.1. At the circumference section of the rotor blade pitch bearing 10.1 surrounding the first face segment 11.1, it has been found that most of the waste grease can be extracted by means of the extraction hoses 30. Therefore, in this circumference section, most of the extraction hoses 30 of all extraction hoses 30 of the waste grease collection arrangement 6 are connected to waste grease outlets. Accordingly, the extraction hoses 30 are connected irregularly along the rotor blade pitch bearing 10.1. Also, most of the waste grease collectors 20 are located in the first face segment 11.1. This circumference section is referred to as the main waste grease collection circumference section 12 (see FIG. 7) as most of the waste grease will be collected from the waste grease outlets located therein.

Figure 7:
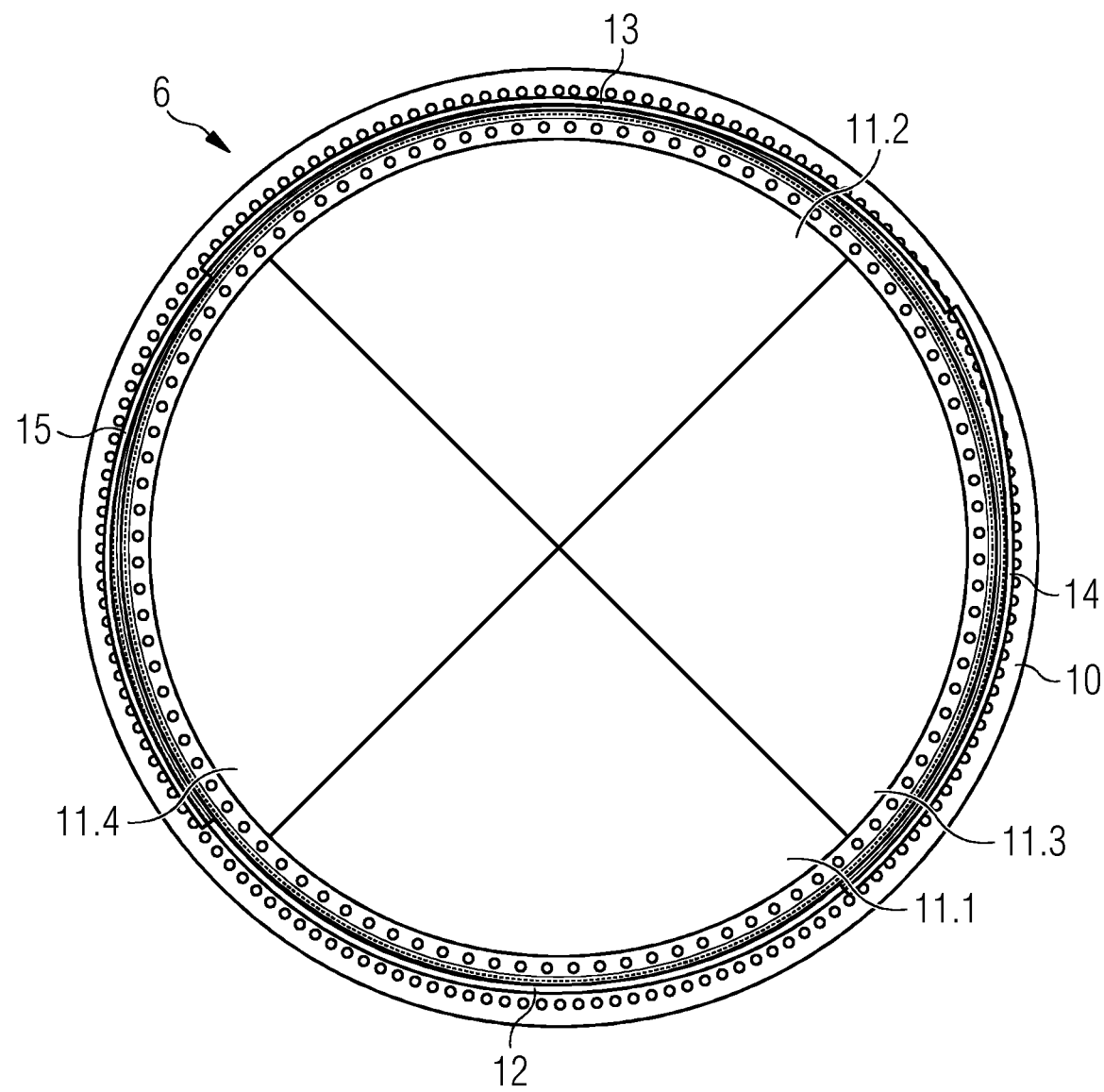
FIG. 7 shows a sectional view on the rotor blade pitch bearing of FIGS. 2 and 3 and without the grease collectors of FIGS. 4 to 6.

FIG. 7 shows the main waste grease collection circumference section 12 in the rotor blade pitch bearing 10 with its first face segment 11.1 but without the waste grease collection arrangement 6 for better comprehension. There are also further circumference sections 14, 15, which be explained in more detail with reference to FIGS. 8 and 9.

One of two further waste grease collectors 20.1, 20.4 is located in each one of the third face segment 11.3 and fourth face segment 11.4 adjacent to the first face segment 11.1. Only six extraction hoses 30.3-30.6 and 30.25-30.30 of every one of the waste grease collectors 20.1-20.4 is connected to waste grease outlets located in the third face segment 11.3 and fourth face segment 11.4. The third face segment 11.3 and the fourth face segment 11.4 are surrounded by secondary waste grease collection circumference sections 14, 15 adjacent to the main waste grease collection circumference section 12 and being equally sized. In these sections 14, 15, waste grease may still be collected from the waste grease outlets located therein, however, there will not be collected as much as from the waste grease outlets of section 12. Accordingly, each of the sections 14, 15 contains only one of the waste grease collector 20.1, 20.4 and there are less extraction hoses 30 connecting the waste grease collectors 20.1, 20.4 with waste grease outlets at these sections 14, 15 compared to the number of extraction hoses 30 connecting the waste grease collectors 20.2, 20.3 with waste grease outlets in the section 12.

None of the waste grease collectors 30 is located in the second face segment 11.2 opposite of the first face segment 11.1 and surrounded by a pressure relief circumference section 13. However, the extraction hoses 30.1, 30.2 of the first waste grease collector 20.1 and the extraction hoses 30.31, 30.32 of the fourth waste grease collector 20.4 are connected to waste grease outlets of the rotor blade pitch bearing 10.1 in the second face 11.2 in order. The extraction hoses 30.1, 30.2, 30.31, 30.32 are relatively longer than some or most of the other extraction hoses 30 and are configured for pressure relief from the rotor blade pitch bearing 10.1 at the pressure relief circumference section 13 rather than to collect waste grease because at section 13 it is unlikely that waste grease will be collected.

Figure 4:
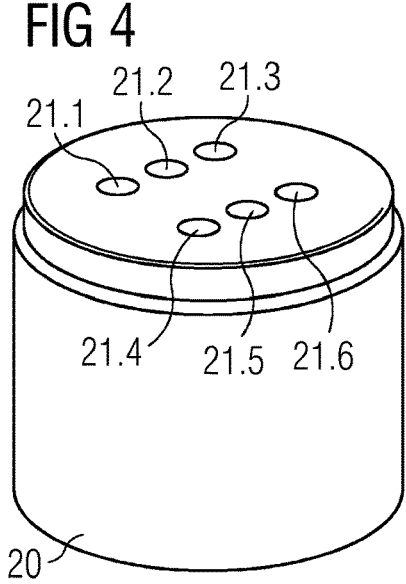
FIG. 4 shows a side perspective view on a waste grease collector.

FIG. 4 shows a waste grease collector 20 of the grease collection arrangement 6. The waste grease collector 20 has six waste grease inlets 21.1, 21.2, 21.3, 21.4, 21.5, 21.6, to which the extraction hoses 30 are connected on the side of the waste grease collector 20. The number of waste grease inlets 21 may alternatively be in the range of 2 to 10 or 3 to 8, for example.

Figure 5:
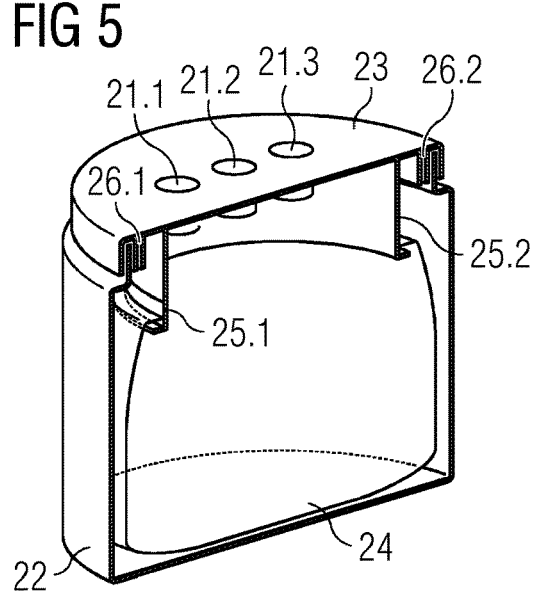
FIG. 5 shows a sectional view on the waste grease collector of FIG. 4.
Figure 6:
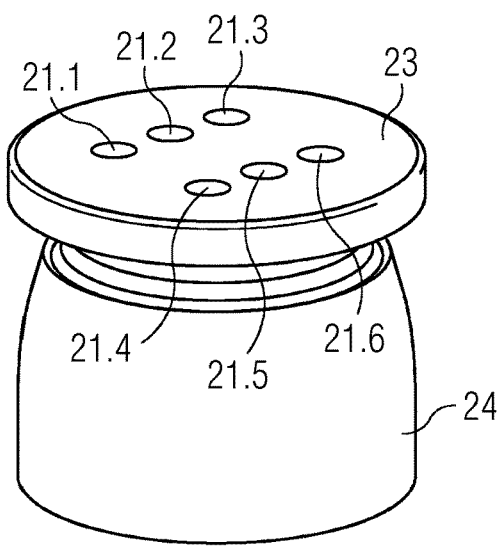
FIG. 6 shows a side perspective view on the disassembled waste grease collector of FIG. 4.
Figure 6:
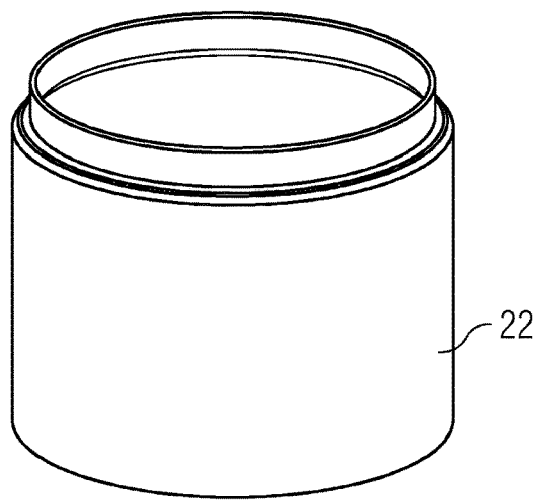

FIG. 5 and FIG. 6 show further details of the waste grease collector 20. The waste grease collector 20 has a container 22 and a lid 23. The lid 23 has the waste grease inlets 21.1, 21.2, 21.3, 21.4, 21.5, 21.6. Further, a bag 24 made from plastic is releasably attached to the lid 23 such that the waste grease collected from the extraction hoses 30 may be inserted through the inlets 21.1, 21.2, 21.3, 21.4, 21.5, 21.6 into the bag 24. The bag 24 may be conveniently detached from the lid 23 and consequently disposed of with its therein collected waste grease.

The lid 23 comprises two air vents 25.1, 25.2 fluidically connecting the inside of the lid 23 with the inside of the container 22. The lid 23 also has two further air vents 26.1, 26.2 fluidically connecting the inside of the container 22 with the outside of the waste grease collector 20, whereby pressure accumulating in the bag 24 may be released from the waste grease collector 20.

FIG. 7 shows the rotor blade pitch bearing 10 with the main waste grease collection circumference section 12 and the pressure relief circumference section 13 located opposite of the main waste grease collection circumference section 12. Further, the two secondary waste grease collection circumference sections 14, 15 are located in between the main waste grease collection circumference section 12 and the pressure relief circumference section 13. As previously explained, the grease collection arrangement 6 is not shown in FIG. 7.

Figure 8:
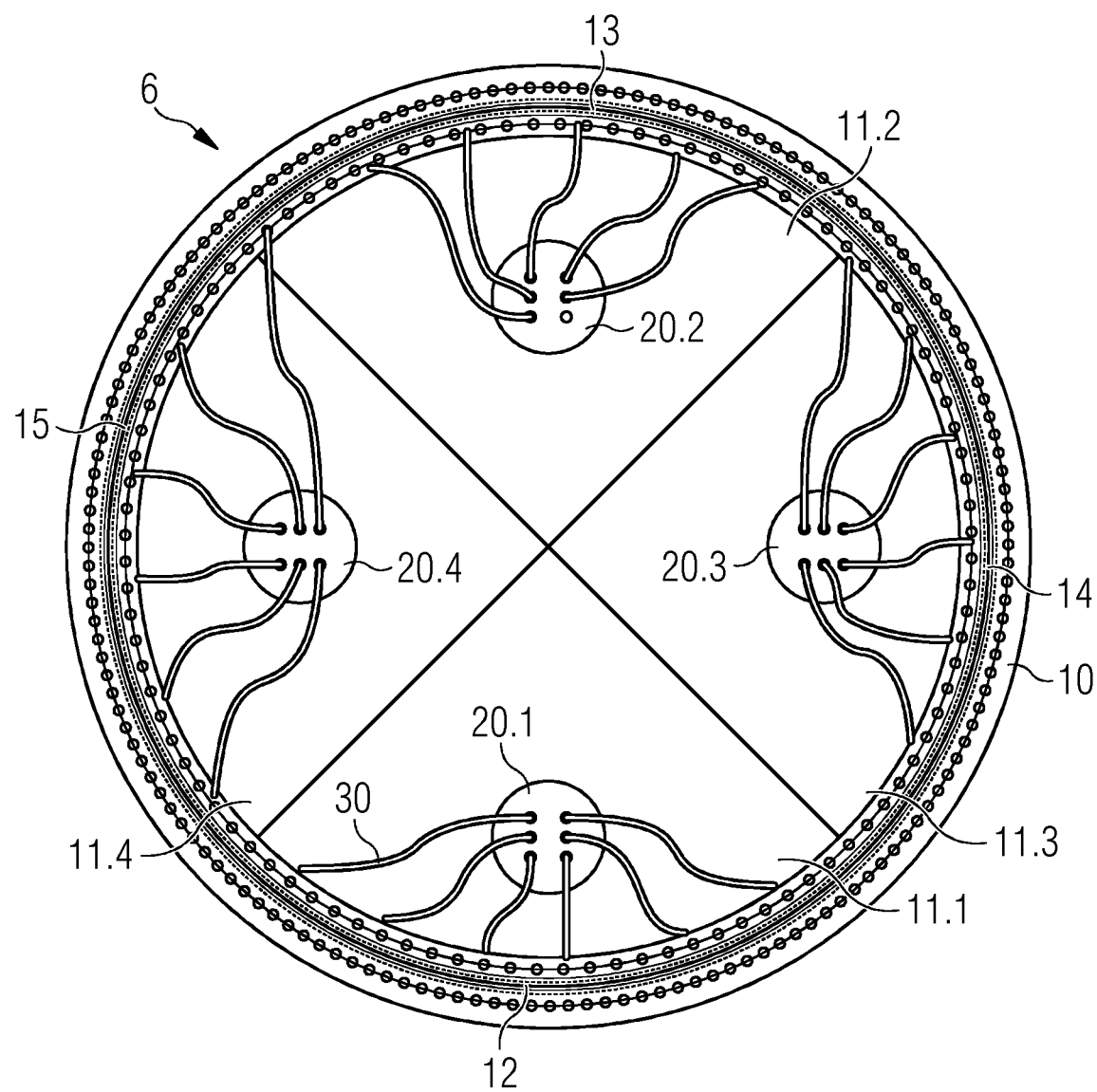
FIG. 8 shows a sectional view on the rotor blade pitch bearing of FIG. 3.

FIG. 8 shows an exemplary waste grease collection arrangement 6 for the rotor blade pitch bearing 10 of FIG. 7. The waste grease collection arrangement 6 comprises four waste grease collectors 20.1, 20.2, 20.3, 20.4. Each one of the waste grease collectors 20.1, 20.2, 20.3, 20.4 is located in one of the four face segments 11.1, 11.2, 11.3, 11.4 and connected to respective waste grease outlets inside of the sections 12, 13, 14, 15 for waste grease collection and pressure relief.

Figure 9:
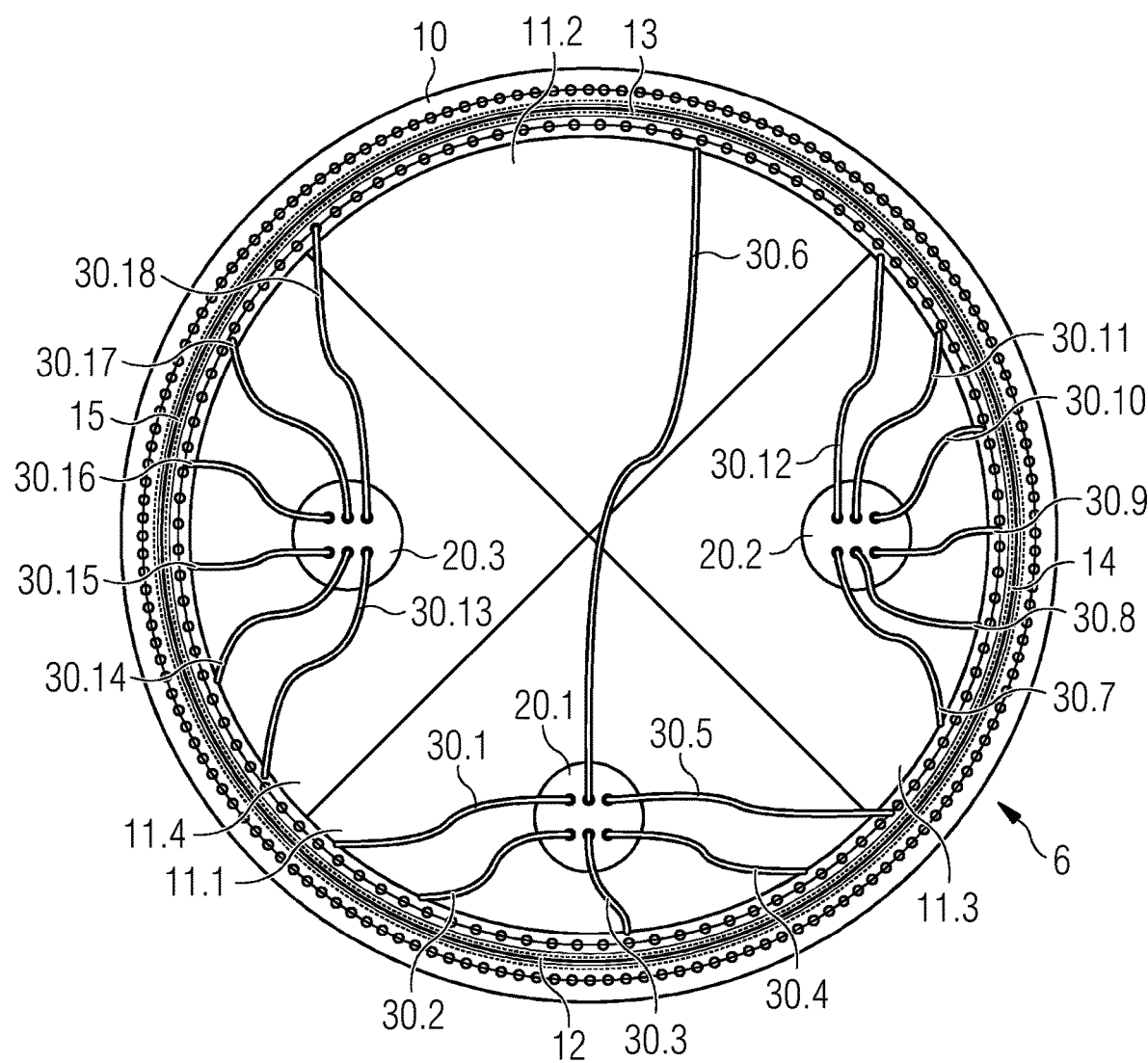
FIG. 9 shows a sectional view on the rotor blade pitch bearing of FIGS. 2 and 3.

FIG. 9 shows an alternative exemplary waste grease collection arrangement 6 of the rotor blade pitch bearing 10 of FIG. 7. The waste grease collection arrangement 6 is similar to the one shown in FIG. 3 with the difference, that the first face segment 11.1 comprises only one waste grease collector 20.1. The sections 12, 14, 15 with the waste grease being mainly and secondarily collected from the therein located waste grease outlets are provided with most of the extraction hoses 30.1-30.18. However, the waste grease collector 20.1 is connected via a relatively long extraction hose 30.6 to a waste grease outlet inside of the section 13 for pressure relief. Also, extraction hoses 30.11, 30.12 from the waste grease collector 20.2 are connected to waste grease outlets inside of the section 13 for pressure relief.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A grease collection arrangement for collecting waste grease from a grease lubricated rotor blade pitch bearing of a wind turbine, wherein the grease collection arrangement comprises:
at least one waste grease collector and multiple extraction tubes,
wherein each one of the multiple extraction tubes is connected to the at least one waste grease collector and the multiple extraction tubes are configured to be connected to multiple grease outlets of the rotor blade pitch bearing, wherein the grease collection arrangement is configured such that the waste grease from the rotor blade pitch bearing can flow into the at least one waste grease collector by gravity and centrifugal forces, wherein the multiple extraction tubes comprise short tubes and long tubes, the long tubes being relatively longer than the short tubes, and wherein the short tubes are configured for collecting the waste grease and the long tubes are configured for pressure relief.

2. The grease collection arrangement according to claim 1, wherein the multiple extraction tubes are extraction hoses.

3. The grease collection arrangement according to claim 1, wherein the grease collection arrangement comprises one to four waste grease collectors.

4. The grease collection arrangement according to claim 1, wherein the grease collection arrangement comprises multiple waste grease collectors.

5. The grease collection arrangement according to claim 4, wherein at least two first extraction tubes of the multiple extraction tubes are connected to a first waste grease collector of the multiple waste grease collectors and at least two second extraction tubes of the multiple extraction tubes are connected to a second waste grease collector of the multiple waste grease collectors.

6. The grease collection arrangement according to claim 1, wherein the at least one waste grease collector comprises at least one air vent.

7. The grease collection arrangement according to claim 1, wherein the at least one waste grease collector comprises a container and a lid for closing the container.

8. The grease collection arrangement according to claim 7, wherein the waste grease collector further comprises a bag for collecting the waste grease, wherein the bag is releasably attached to the lid.

9. The grease collection arrangement according to claim 7, wherein the lid comprises multiple waste grease inlets for the multiple extraction tubes.

10. A grease lubricated rotor blade pitch bearing of a wind turbine, the grease lubricated rotor blade pitch bearing comprising the grease collection arrangement according to claim 1, wherein the multiple extraction tubes of the grease collection arrangement are connected to multiple grease outlets of the grease lubricated rotor blade pitch bearing.

11. The grease lubricated rotor blade pitch bearing according to claim 10, wherein the grease lubricated rotor blade pitch bearing comprises a main waste grease collection circumference section and a pressure relief circumference section, wherein more of the multiple extraction tubes are connected to waste grease outlets in the main waste grease collection circumference section than in the pressure relief circumference section.

12. The grease lubricated rotor blade pitch bearing according to claim 10, wherein the rotor blade pitch bearing further comprises two secondary waste grease collection circumference sections in between the main waste grease collection circumference section and the pressure relief circumference section, wherein more of the multiple extraction tubes are connected to waste grease outlets in any one of the secondary waste grease collection circumference sections than in the pressure relief circumference.

13. A wind turbine comprising the grease lubricated rotor blade pitch bearing according to claim 10.

\* \* \* \* \*